United States Patent
Xiao

(10) Patent No.: US 8,548,189 B2
(45) Date of Patent: Oct. 1, 2013

(54) POSITIONING STRUCTURE FOR SPEAKER OF PORTABLE ELECTRONIC DEVICE

(75) Inventor: Zhi-Qiang Xiao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 534 days.

(21) Appl. No.: 12/872,121

(22) Filed: Aug. 31, 2010

(65) Prior Publication Data

US 2011/0261989 A1 Oct. 27, 2011

(30) Foreign Application Priority Data

Apr. 23, 2010 (CN) .......................... 2010 1 0153535

(51) Int. Cl.
*H04R 1/02* (2006.01)
(52) U.S. Cl.
USPC ........... 381/386; 381/322; 381/391; 381/392; 381/395

(58) Field of Classification Search
USPC ............................ 381/386, 391, 392, 322, 395
See application file for complete search history.

(56) References Cited

U.S. PATENT DOCUMENTS

| | | | | |
|---|---|---|---|---|
| 7,349,551 B2 * | 3/2008 | Skillicorn et al. | | 381/384 |
| 2006/0050917 A1 * | 3/2006 | Skillicorn et al. | | 381/384 |
| 2007/0154054 A1 * | 7/2007 | Hayasaka et al. | | 381/386 |

FOREIGN PATENT DOCUMENTS

KR  10-2009-0035133  *  2/2010  ............... H04R 9/02

* cited by examiner

*Primary Examiner* — Davetta W Goins
*Assistant Examiner* — Amir Etesam
(74) *Attorney, Agent, or Firm* — Altis & Wispro Law Group, Inc.

(57) ABSTRACT

An exemplary positioning structure for a portable electronic device includes a support element, a metal element, and a ring seal. The support element defines an opening. The metal element is attached to the support element. The metal element includes a projection and a depression. The opening and the depression receives the speaker. The ring seal is placed around the projection.

6 Claims, 5 Drawing Sheets

POSITIONING STRUCTURE FOR SPEAKER OF PORTABLE ELECTRONIC DEVICE

BACKGROUND

1. Technical Field

The present disclosure relates to positioning structures, and particularly to a positioning structure for mounting a speaker to a portable electronic device.

2. Description of Related Art

Portable electronic devices generally need a speaker to output sound. A typical speaker is fixed to a cover of the portable electronic device. The cover is further fixed to a main housing of the portable electronic device with screws. During assembly, the screws need to be screwed tightly to assemble the cover to the main housing. The screwing process might shift the speaker out of position, thereby degrading the quality of the product. In addition, portable electronic devices usually include a plurality of electrical components around the speaker. Electrostatic charges are liable to build up in the electrical components, and suddenly discharge and damage the speaker.

Therefore, there is room for improvement within the art.

BRIEF DESCRIPTION OF THE DRAWINGS

Many aspects of the present positioning structure can be better understood with reference to the following drawings. The components in the drawings are not necessarily drawn to scale, the emphasis instead being placed upon clearly illustrating the principles of the positioning structure. Moreover, in the drawings, all the views are schematic, and like reference numerals designate corresponding parts throughout the several views.

DETAILED DESCRIPTION

The present positioning structure may be applied in many different electronic devices such as mobile phones, game devices, PDAs (personal digital assistants) and others. In an illustrated exemplary embodiment, the positioning structure is used in a mobile phone.

Figure 1:
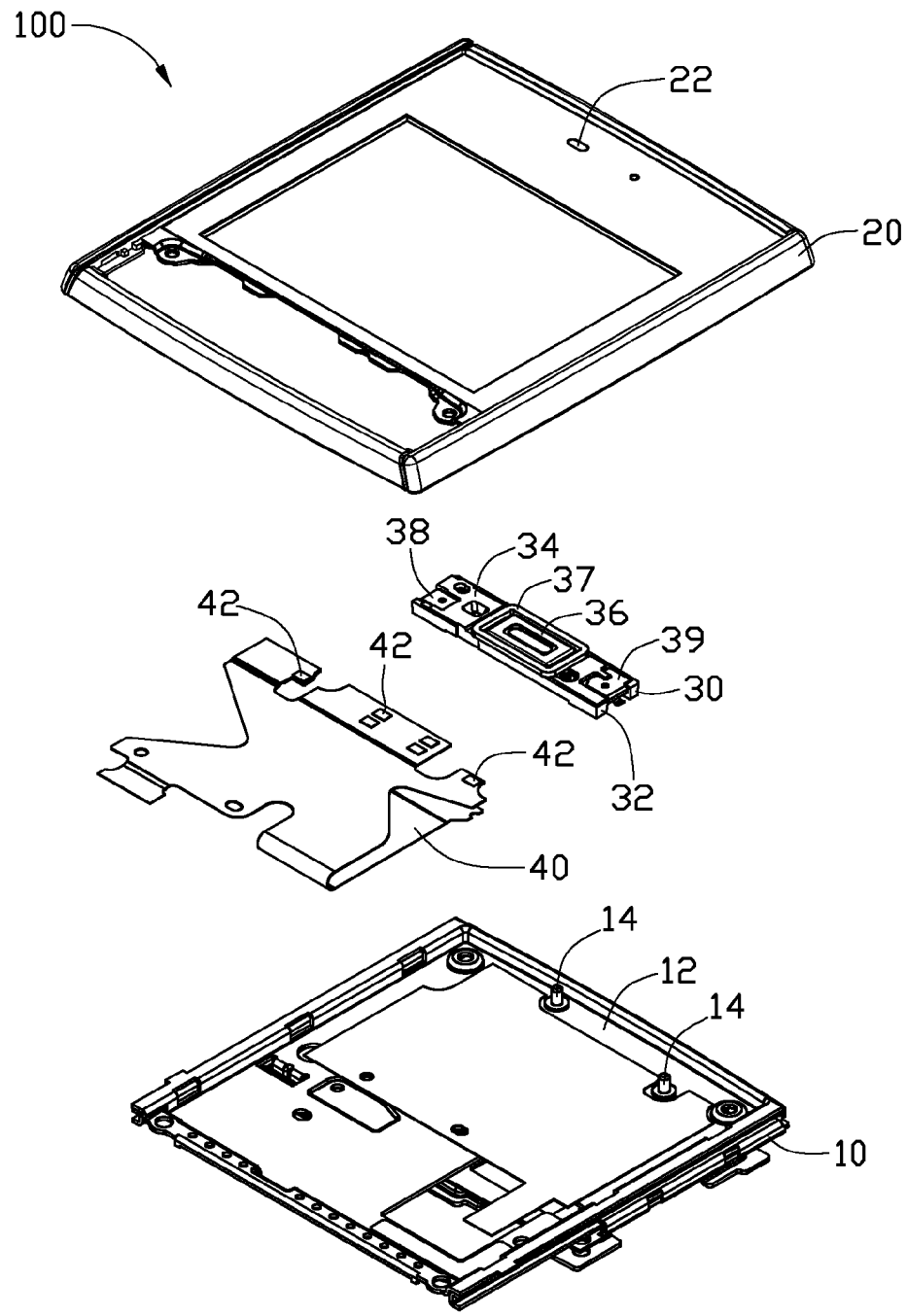
FIG. 1 is an exploded, isometric view of a portable electronic device with a positioning structure according to an exemplary embodiment.

FIG. 1 shows a mobile phone 100 including a housing 10, a cover 20, a positioning structure 30 and an electrically conductive element 40. The positioning structure 30 and the conductive element 40 are sandwiched between the cover 20 and the housing 10. The conductive element 40 is used for removal of electrostatic charges from the positioning structure 30.

The housing 10 can be one portion of a housing of a mobile phone, and includes a base plate 12. At least two posts 14 are positioned on one end of the base plate 12. The cover 20 is attached to the housing 10. A through hole 22 is defined in one end of the cover 20.

Figure 2:
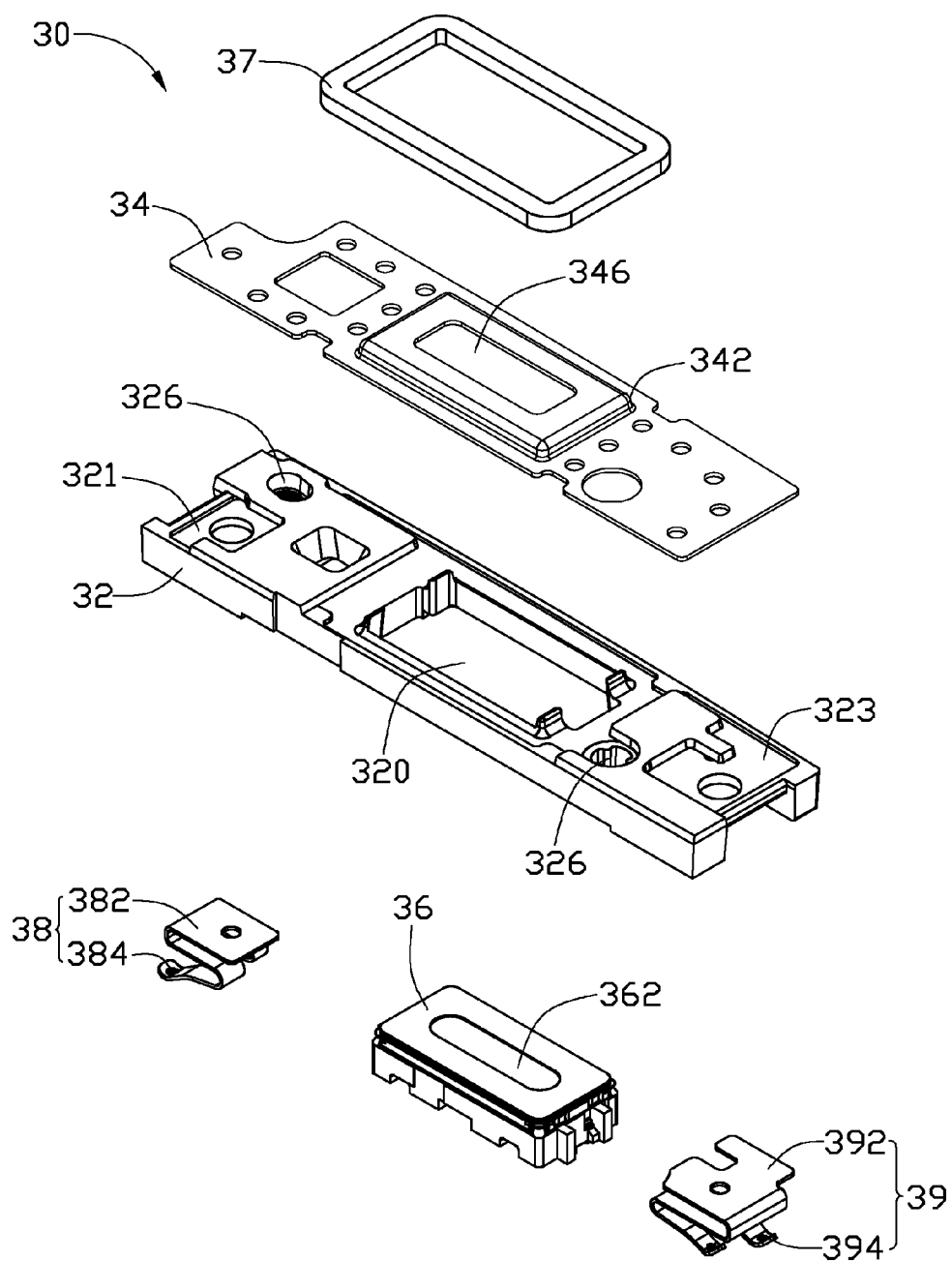
FIG. 2 is an enlarged, exploded view of the positioning structure of FIG. 1.
Figure 3:
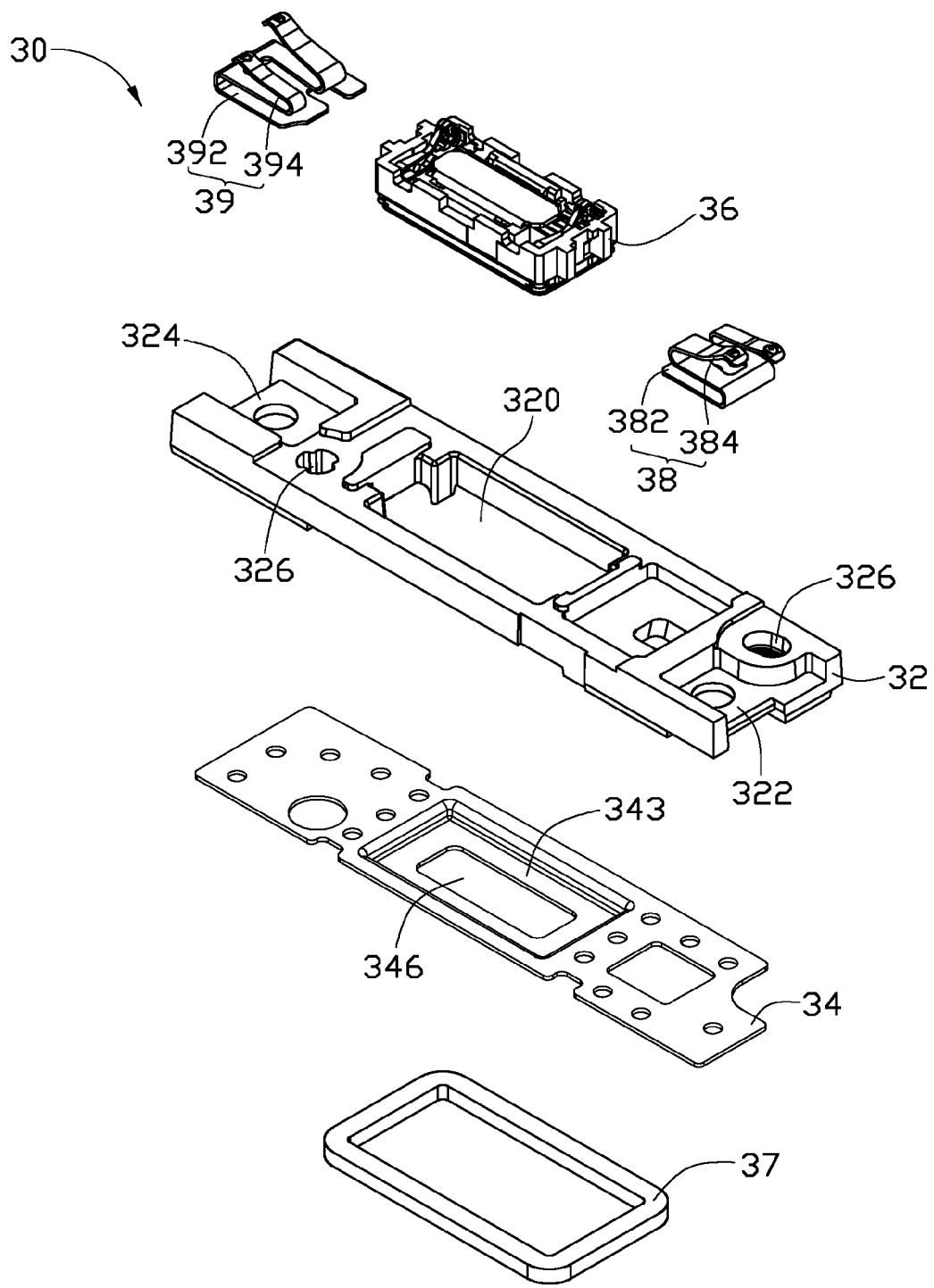
FIG. 3 is similar to FIG. 2, but viewed from another aspect.

Referring to FIGS. 2 and 3, the positioning structure 30 includes a support element 32, a metal element 34, a ring seal 37, a first elastic element 38 and a second elastic element 39. The positioning structure 30 is used for mounting a speaker 36 in the mobile phone 100.

The support element 32 is made of plastic and is formed by injection molding. An opening 320 is defined in a middle area of the support element 32. A first recess 321 and a second recess 323 are defined in opposite ends of a top side of the support element 32, respectively. A first groove 322 and a second groove 324 are defined in the opposite ends of a bottom side of the support element 32, respectively. At least two holes 326 are defined in the support element 32. The holes 326 correspond to the posts 14, for mounting the support element 32 to the housing 10.

The metal element 34 is attached to the support element 32. In this exemplary embodiment, the metal element 34 is generally plate-shaped, and is integrally formed with the support element 32 by insert molding. A frame-shaped projection 342 protrudes from a top side of the metal element 34. Thereby, a depression 343 is defined at a bottom side of the metal element 34, corresponding to the projection 342. The depression 343 and the opening 320 together are configured for receiving the speaker 36. The projection 342 defines an orifice 346. When the cover 20 is attached to the housing 10, the orifice 346 is aligned with the through hole 22.

The speaker 36 defines a sound port 362 at one side thereof (i.e., the top side). When the speaker 36 is received in the opening 320 of the support element 32, the sound port 362 is aligned with the orifice 346.

The ring seal 37 is made of elastic material such as plastic or rubber, and can be placed around the protrusion 342. The ring seal 37 is sandwiched between the metal element 34 and the cover 20 and surrounds the protrusion 342, to prevent sound from the speaker 36 leaking from a clearance between the metal element 34 and the cover 20.

The first elastic element 38 and the second elastic element 39 can be latched to the opposite ends of the support element 32. In the present embodiment, the first and second elastic elements 38, 39 are made of metal. The first elastic element 38 includes a clamping portion 382 and a plurality of bent arms 384. The clamping portion 382 is configured for being received in the first recess 321 and the first groove 322, and clamping one end of the support element 32. The bent arms 384 are obliquely angled with respect to the clamping portion 382, and can be electrically connected to the conductive element 40. In particular, the bent arms 384 can resiliently (elastically) press the conductive element 40 when the mobile phone 100 is assembled. The second elastic element 39 is similar to the first elastic element 38, and includes a clamping portion 392 and a plurality of bent arms 394. The clamping portion 392 is configured for being received in the second recess 323 and the second groove 324, and clamping the other end of the support element 32. The bent arms 394 are obliquely angled with respect to the clamping portion 392, and can be electrically connected to the conductive element 40.

The conductive element 40 is used for removing electrostatic charges from the speaker 36 and the metal element 34. In an exemplary embodiment, the conductive element 40 is a flexible printed circuit board. A number of contacts 42 are positioned on the conductive element 40 for electrically connecting the bent arms 384 and 394 to a grounding pin (not shown) of the mobile phone 100.

Figure 4:
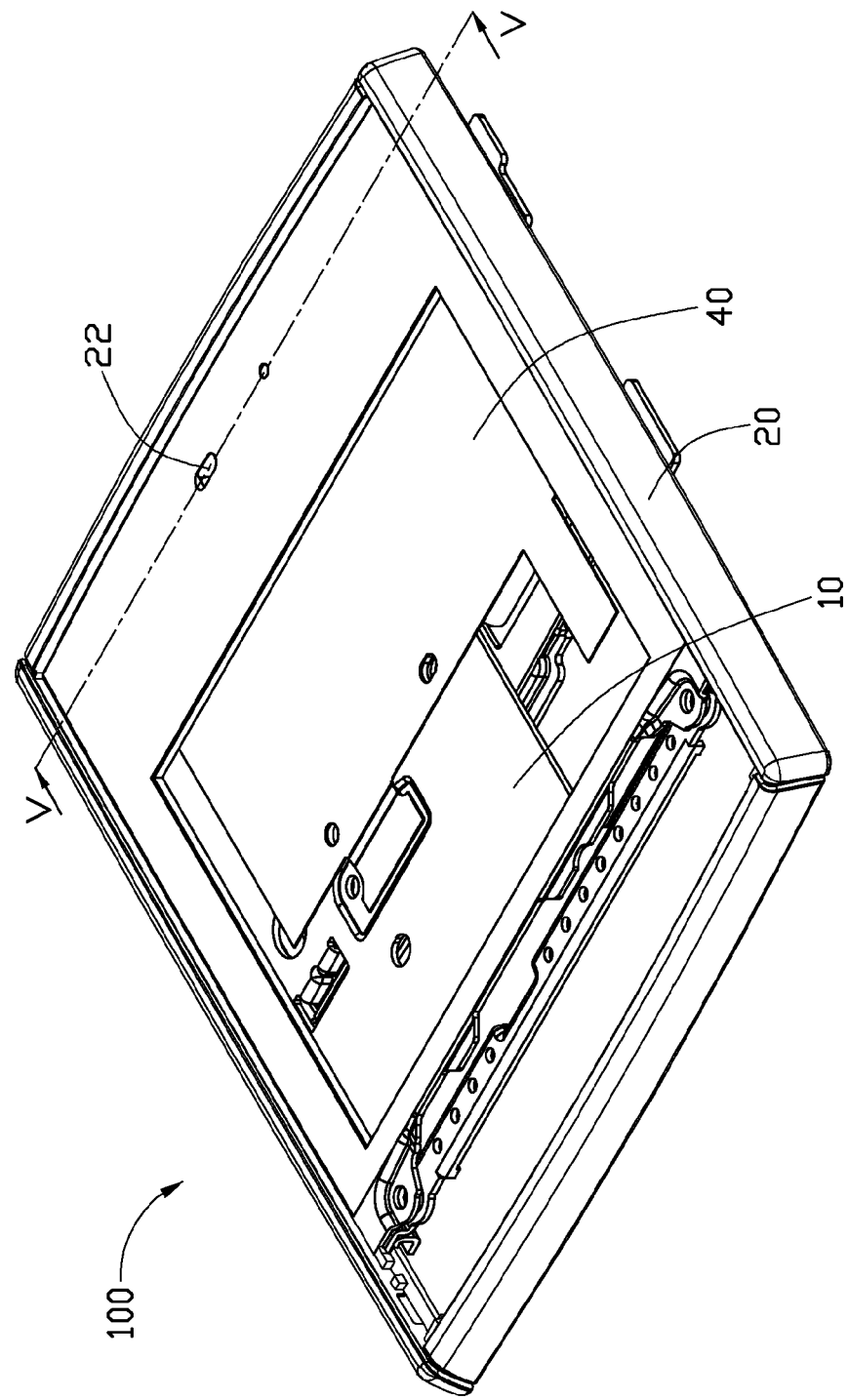
FIG. 4 is an assembled view of the portable electronic device shown in FIG. 1.
Figure 5:
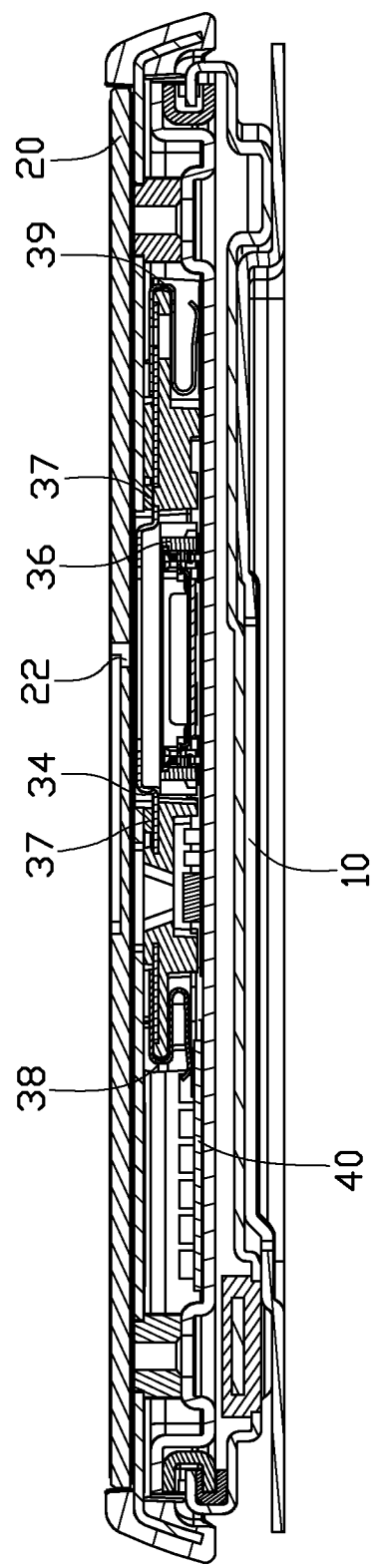
FIG. 5 is a cross-sectional view of the portable electronic device of FIG. 4 taken along line V-V thereof.

FIG. 4 shows the mobile phone 100 assembled. In this state, the first elastic element 38 is received in the first recess 321 and the first groove 322 and clamps one end of the support element 32. The second elastic element 39 is received in the second recess 323 and the second groove 324 and clamps the other end of the support element 32. The first elastic element 38 and the second elastic element 39 are respectively welded to the metal element 34. The ring seal 37 is placed around the projection 342. The speaker 36 is received in the opening 320 and the depression 343, and the sound port 362 is aligned with the orifice 362. The conductive element 40 is attached to the housing 10. The assembled positioning structure 30 is positioned on the conductive element 40 of the housing 10. The posts 14 of the housing 10 pass through the holes 326 of the support element 32. The cover 20 is attached to the housing 10, and abuts against the ring seal 37. The through hole 22, the sound port 362 and the orifice 346 are aligned with each other. The speaker 36, the first elastic element 38 and the second elastic element 39 are electrically connected to the conductive element 40. The metal element 34 and the support element 32 help the speaker 36 to be accurately fixed to the mobile phone 100. The assembly process is easy and convenient. In addition, the ring seal 37 helps prevent sound from leaking and thereby improves the sound quality of the speaker 36.

It is to be understood, however, that even through numerous characteristics and advantages of exemplary embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A speaker positioning assembly for a portable electronic device, the speaker positioning assembly comprising:
   an electrically conductive element;
   a speaker;
   a support element defining an opening in a middle area, a first recess and a second recess in opposite ends of a first surface of the support element, a first groove and a second groove in opposite ends of a second surface of the support element;
   a metal element adjoining the support element, the metal element including a depression, the opening and the depression receiving the speaker; and
   a first elastic element and a second elastic element being separate from each other, each of the first elastic element and the second elastic element including a clamping portion and a plurality of bent arms, the clamping portion of the first elastic element received in the first groove and the first recess, the clamping portion of the second elastic element received in the second groove and the second recess for allowing the first elastic element and the second elastic element respectively clamping two ends of the support element, the bent arms of the first elastic element and the second elastic element being angled with respect to the clamping portions and electrically connecting the metal element to the electrically conductive element.

2. The speaker positioning assembly of claim 1, wherein the metal element further includes a projection, which protrudes from a top side of the metal element, and the depression is defined at a bottom side of the metal element corresponding to the projection.

3. The speaker positioning assembly of claim 2, wherein the projection defines an orifice, the speaker includes a sound port, and the orifice and the sound port are aligned with each other.

4. The speaker positioning assembly of claim 1, further comprising a ring seal, wherein the ring seal is positioned around the projection.

5. The speaker positioning assembly of claim 1, wherein each of the clamping portions of the first elastic element and the second elastic element includes a first plate and a second plate connected to each other, the first plate and the second plate of the clamping portion of the first elastic element are respectively latched in the first groove and the first recess; the first plate and the second plate of the clamping portion of the second elastic element are respectively latched in the second groove and the second recess.

6. The speaker positioning assembly of claim 5, wherein the metal element is positioned on the first surface of the support element, the electrically conductive element is positioned at the second surface of the support member, the clamping portions of the first elastic element and the second elastic element are electronically connected to the metal element, and the bent arms of the first elastic element and the second elastic element electronically connected to the conductive element.

* * * * *